ELECTRICAL SYSTEMS

Filed June 29, 1953 5 Sheets-Sheet 1

INVENTOR.
FRANK J. BINGLEY
BY
Cecilia V. Hazeltine
ATTORNEY

Feb. 28, 1956 F. J. BINGLEY 2,736,764

ELECTRICAL SYSTEMS

Filed June 29, 1953 5 Sheets-Sheet 2

INVENTOR.
FRANK J. BINGLEY
BY
[signature]
ATTORNEY

ELECTRICAL SYSTEMS

Filed June 29, 1953 5 Sheets-Sheet 3

INVENTOR.
FRANK J. BINGLEY
BY
Allen U. Hazeltine
ATTORNEY

ELECTRICAL SYSTEMS

Filed June 29, 1953 5 Sheets-Sheet 4

INVENTOR.
FRANK J. BINGLEY
BY
Allen U. Hazeltine
ATTORNEY

INVENTOR.
FRANK J. BINGLEY
BY
ATTORNEY

United States Patent Office 2,736,764

Patented Feb. 28, 1956

2,736,764

ELECTRICAL SYSTEMS

Frank J. Bingley, Meadowbrook, Pa., assignor to Philco Corporation, Philadelphia, Pa., a corporation of Pennsylvania Application June 29, 1953, Serial No. 364,678

28 Claims. (Cl. 178—5.4)

The present invention relates to electrical systems and more particularly to cathode-ray tube systems comprising a beam intercepting structure and indexing means arranged in cooperative relationship with the beam intercepting structure and adapted to produce a signal whose time of occurrence is indicative of the position of the cathode-ray beam. This application is a continuation-in-part of application Serial No. 324,380, filed December 5, 1952.

The invention is particularly adapted for use with, and will be described in connection with, a color television image presentation system utilizing a single cathode-ray tube having a beam intercepting, image forming screen member comprising vertical stripes of luminescent materials. These stripes are preferably arranged in laterally displaced color triplets, each triplet comprising three vertical phosphor stripes which respond to electron impingement to produce light of the different primary colors. The order of arrangement of the stripes may be such that the normal horizontally scanning cathode-ray beam produces red, green and blue light successively. From a color television receiver there may then be supplied a video signal having signal components definitive of the brightness and chromaticity of the image to be reproduced, which wave is utilized to control the intensity of the cathode-ray beam to the required instantaneous value as the beam scans the phosphor stripes.

For proper color rendition it is then required that, as the phosphor stripes producing each of the primary colors of light are impinged by the cathode-ray beam, the intensity of the beam be simultaneously controlled in response to the contemporaneous value of the video signal representing the corresponding color component of the televised image. Such a synchronous relationship may be maintained throughout the scanning cycle by deriving indexing signals indicative of the instantaneous position of the cathode-ray beam upon the image forming screen, and by utilizing these signals to control the relationship between the phase of the video wave and the position of the beam. The said indexing signals may be derived from a plurality of stripe regions of the beam intercepting screen structure, each adjacent to a color triplet, so that, when the beam scans the screen, these indexing regions are excited in spaced time sequence relative to the scanning of the color triplets and a series of pulses is generated in a suitable output electrode system of the cathode-ray tube.

The indexing regions may be constituted of a layer of a material adapted to exhibit secondary electron emissive properties at specified portions thereof different from the secondary emissive properties at other portions thereof. Such differences in secondary electron emissivities may be attained by employing an underlying layer having different portions which exhibit correspondingly different values of resistance to electron flow as disclosed and claimed in the copending application of William E. Bradley and Meier Sadowsky, Serial No. 313,018, filed October 3, 1952. In another form, the indexing regions may be in the form of stripes and may comprise a material having secondary emissive properties which differ from the secondary emissive properties of the remaining portions of the beam intercepting structure. For example, such indexing stripes may consist of a high atomic number metal, such as gold, platinum or tungsten, or may consist of certain oxides such as cesium oxide or magnesim oxide. Alternatively, the indexing regions may consist of stripes of a fluorescent material, and the indexing signals may be derived from a suitable photoelectric cell arranged, for example, in a sidewall portion of the cathode-ray tube out of the path of the cathode-ray beam and facing the beam intercepting surface of the screen structure. The photoelectric cell may be selectively actuated by these fluorescent stripes. More particularly by an appropriate selection of the material of the stripes i. e. by making the stripes of a fluorescent material such as zinc oxide, having a spectral output in the non-visible light region and by means of an appropriate filter arranged in the photocell system, the photocell may be energized by the non-visible emanations to the exclusion of visible light produced by the image producing phosphor stripes. Alternatively, the desired selective action may be produced by means of an electron permeable, light opaque coating, i. e. an aluminum coating, arranged between the image producing phosphor stripes and the index signal producing fluorescent regions.

In practice there exists the danger that the normally detectable voltage, indicating the impingement of the beam on the indexing regions, may be masked or at least contaminated by spurious voltages. More particularly, it is found that, at the high accelerating voltages of the order of 10 to 20 kilovolts used in the cathode-ray tubes for the systems under consideration, only a relativley small difference in the secondary emissive ratio of the indexing regions and of the remainder of the screen structure can be realized so that variations of the beam intensity due to the video signals, and hence the corresponding variations of the current produced in collector electrode system of the cathode-ray tube, may significantly diminish the effective value of the indexing signal. Similarly, in those instances in which the indexing signal is produced by means of a photoelectric detector and indexing stripes comprising a fluorescent material, the variations of the beam intensity due to the video signal produce corresponding variations in the intensity of the radiation derived from the photoelectric cell, thereby producing an indexing signal similarly contaminated by the video signal.

It is an object of the invention to provide improved cathode-ray tube systems of the type in which the position of an electron beam on a beam intercepting screen structure is indicated by an indexing signal derived from an indexing component of the screen structure.

A further object of the invention is to provide improved cathode-ray tube systems of the foregoing type in which a clearly defined indexing signal is produced.

A specific object of the invention is to provide improved cathode-ray tube systems of the foregoing type in which the intensity of the indexing signal is independent of video information applied to the system.

These and further objects of the invention will appear as the specification progresses.

In accordance with the invention, in a cathode-ray tube system adapted to generate an indexing signal having variations, the time phase positions of which are indicative of the positions of the beam, the foregoing objects are achieved by supplying the beam intensity control system of the cathode-ray tube with the color image information to be reproduced during predetermined periods of the operation of the image reproducing system, and by deriving the desired indexing information generated by the beam intercepting screen during alternate periods of the operation of the image reproducing system. More particularly, and in accordance with one embodiment of the invention, the color video wave supplied to the beam intensity control system of the cathode-ray tube is periodically interrupted at a given rate, during which interruptions the intensity of the beam is established at a predetermined value independently of the amplitude of the color video wave. Under this condition the indexing information produced during the interruption periods has a magnitude established substantially entirely by the preestablished intensity of the beam and by the beam response characteristic of the indexing elements of the beam intercepting screen. Accordingly, by suitably actuating the output indexing circuit of the indexing system in synchronism with the interruption of the video wave, an indexing signal free from video contamination may be readily achieved.

In one arrangement to be described hereinafter, the video wave is interrupted at a rate of the order of two or more times the maximum frequency thereof and the output indexing circuit is synchronously interrupted to provide a multiplicity of indexing pulses consecutively recurring during the interruption periods of the video wave. These pulses may thereafter be supplied to a suitable smoothing or integrating circuit to form the desired indexing signal.

In a second arrangement, the indexing information derived from the beam intercepting screen is initially supplied to a signal storage device. This storage device is operated in synchronism with the scanning of the beam intercepting image screen and provides an output signal which in turn serves as an indexing signal for controlling the relationship between the phase of the color image information supplied to the cathode-ray beam which energizes the image screen and the position of the beam. More specifically, there may be provided a cathode-ray signal-storage tube having a charge storage target which is scanned in synchronism with the scanning of the image screen of the image reproducing tube, and to which indexing information as derived from the screen of the image tube is applied. The storage tube in turn is adapted to produce an output indexing signal as determined by the charge pattern formed on the target thereof, which output indexing signal serves to control the time phase position of the color signal applied to the image reproducing tube relative to the scanning of the phosphor stripes.

A storage tube having a long memory may be used, in which case the indexing information may be supplied thereto from the image tube at the inception of the receiving period, or periodically at spaced intervals, or between "station-breaks" of the received program. By deriving indexing information from the image tube during these periods, at which time the generated indexing information is substantially free from video information, a well defined indexing signal charge pattern may be produced at the target of the storage tube so that a corresponding well defined output indexing signal is subsequently available from the storage tube.

Alternatively, a storage tube having a relatively short memory may be used, in which case the indexing information from the image tube may be supplied to the target thereof during consecutive intervals, for example at the end of each line scanning period, or may be supplied to the target continuously during the program period. In the latter instance, the storage tube may be operated under conditions which take advantage of the random nature imparted to the video information and noise by successive scansions of the target so that this undesirable information is effectively integrated out and a clearly defined output indexing signal is derived from the storage tube.

The invention will be described in greater detail with reference to the appended drawings forming part of the specification and in which.

Figure 1:
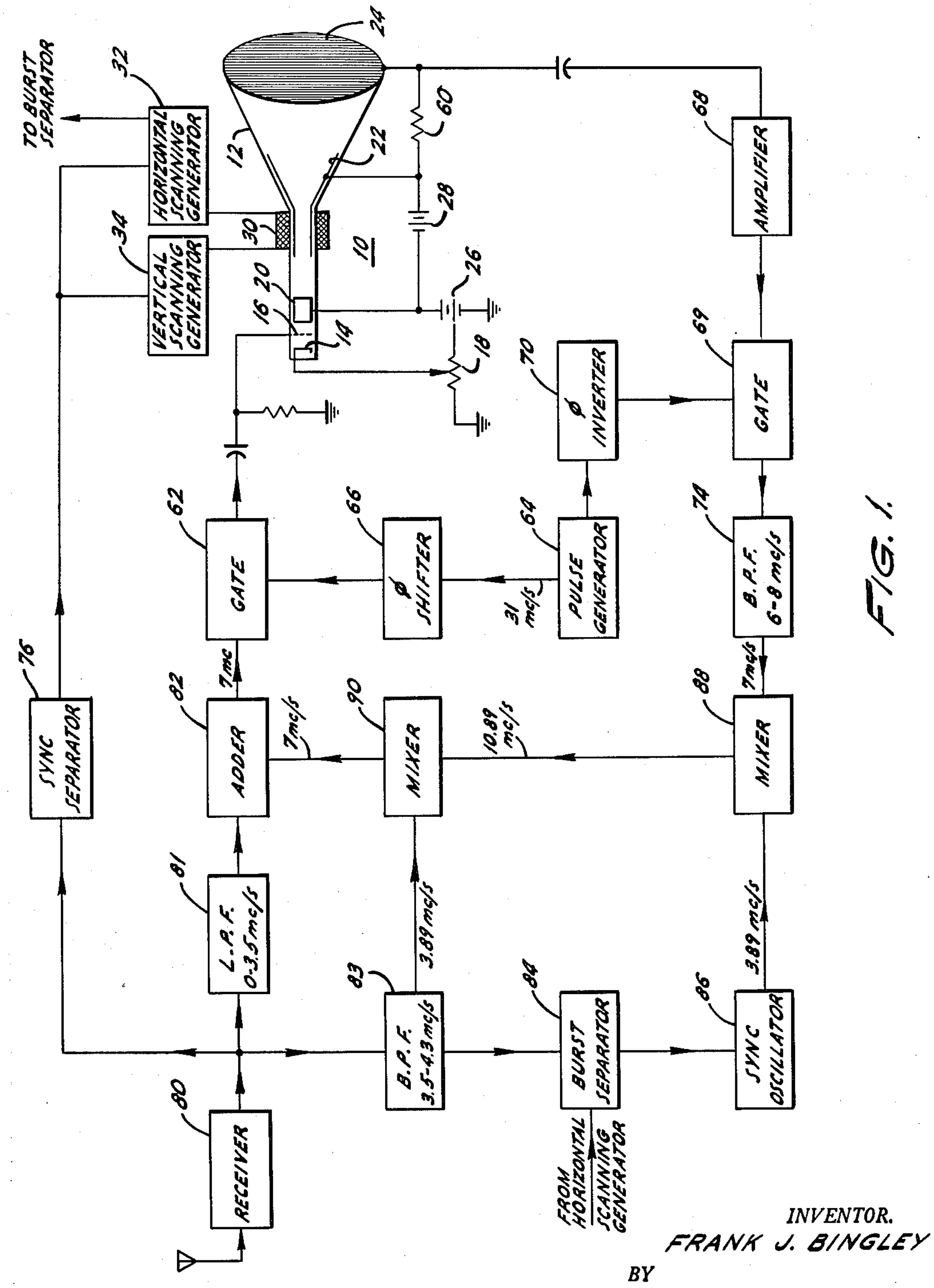
Figure 1 is a block diagram, partly schematic, showing one embodiment of a cathode-ray tube system in accordance with the invention.

Referring to Figure 1, the cathode-ray tube system there shown comprises a cathode-ray tube 10 containing, within an evacuated envelope 12, a beam generating and intensity control system comprising a cathode 14, a control electrode 16, a focusing anode 20 and an accelerating anode 22, the latter of which may consist of a conductive coating on the inner wall of the envelope, which coating terminates at a point spaced from the end face 24 of the tube in conformity with well established practice. The electrodes of the system are maintained at their desired operating potentials by suitable voltage sources shown as batteries 26 and 28, the battery 26 having its positive pole connected to the anode 20 and its negative pole connected to a point at ground potential, and the battery 28 being connected with its positive pole to electrode 22 and its negative pole to the positive pole of battery 26. The potential of the control electrode 16 relative to the cathode 14 may be established at an appropriate value by means of a potentiometer 18 which is connected to an appropriate voltage point of the source 26, and the movable arm of which is connected to the cathode 14.

A deflection yoke 30, coupled to horizontal and vertical deflection signal generators 32 and 34 respectively, is provided for deflecting the electron beam across the faceplate 24 of the tube to form a raster thereon.

Figures 2, 4:
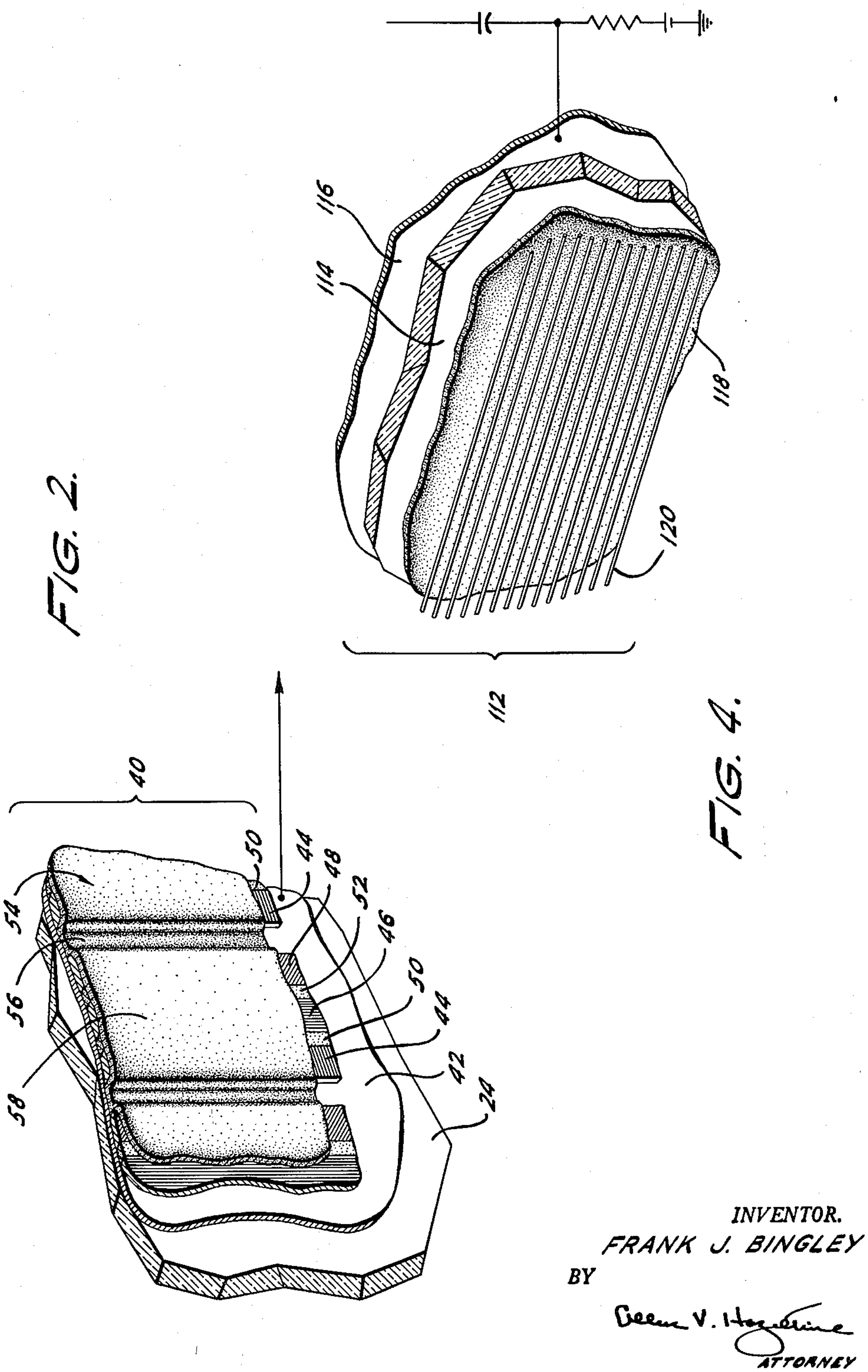
Figure 2 is a perspective view of a portion of one form of an image reproducing screen structure suitable for the cathode-ray tube systems of the invention.
Figure 4 is a perspective view of a portion of one form of a target electrode of a storage tube suitable for the cathode-ray tube systems of the invention.

The end faceplate 24 of the tube 10 is provided with a beam intercepting structure 40, one suitable form of which is shown in Figure 2. In the arrangement shown in Figure 2 the structure 40 is formed directly on the faceplate 24. However, it is evident that the structure 40 may be formed on a base which is independent of the faceplate 24 and may be spaced therefrom. The faceplate 24 may, in practice, consist of glass having preferably substantially uniform transmission characteristics for the various colors of the visible spectrum and is provided with a light transparent electrically conductive coating 42, which may be a coating of stannic oxide or of a metal, such as silver, having a thickness only sufficient to achieve the desired conductivity. The faceplate is also provided with a plurality of parallelly arranged stripes 44, 46 and 48 of phosphor materials which, upon impingement of the cathode-ray beam, fluoresce to produce light of three different primary colors. For example, the stripe 44 may consist of a phosphor such as zinc phosphate containing manganese as an activator, which, upon electron impingement, produces red light; the stripe 46 may consist of a phosphor such as zinc orthosilicate, which produces green light; and the stripe 48 may consist of a phosphor such as calcium magnesium silicate containing titanium as an activator, which produces blue light. Other suitable materials which may be used to form the phosphor stripes 44, 46 and 48 are well known to those skilled in the art, as well as methods of applying the same to the faceplate 24, and the statement of further details concerning the same is therefore believed to be unnecessary.

Each of the groups of stripes may be termed a color triplet, and, as will be noted, the sequence of the stripes is repeated in consecutive order over the area of the structure 40.

For generating indexing information in the manner described and claimed in the above mentioned copending application of William E. Bradley and Meier Sadowsky, the phosphor stripes 44, 46 and 48 are arranged in spaced relationship and the spacing between stripes 44—46 and between 46—48 are filled with an electrically insulating material such as unactivated willemite, the said stripes so formed being shown as 50 and 52 respectively. Arranged over the stripes 44, 46, 48, 50 and 52, and in contact with the coating 42 at the spaces b etween the stripes 44 and 48, is a coating 54 of a material adapted to exhibit different secondary electron emissivities determined by the resistance to electron flow of the underlying layer. Such a material may be magnesium oxide, which, in the construction shown, exhibits, at its portions 56 in contact with the conductive layer 42, a secondary electron emissivity different from that exhibited by its portions 58 overlying the stripes 44, 46, 48, 50 and 52.

The beam intercepting structure so constituted is connected to the positive pole of battery 28 through a load impedance 60 (see Figure 1) by means of a suitable connection to the conductive coating 42 thereof.

The cathode-ray beam, in its vertical and horizontal travel across the beam intercepting structure 40, successively impinges on the portions 56 and 58 of the coating 54 and produces, across the load impedance 60, a secondary emissive current having amplitude variations as determined by the intensity of the beam and by the difference in the secondary electron emissivities of the portions 56 and 58 of the coating.

Because of the video information normally modulating the intensity of the beam, the desired indexing information, as represented by the amplitude variations above noted, is masked or contaminated to a greater or lesser extent, and the effectiveness of the desired indexing information is thereby reduced. In accordance with the embodiment of the invention shown in Figure 1, this undesirable contamination of the indexing information is obviated by periodically interrupting the color video wave supplied to the intensity control electrode 16 and by deriving the indexing signal from the beam intercepting screen during these interruption periods. More particularly, the color video wave, derived in a manner later to be more fully discussed, is supplied to the electrode 16 through a gating system 62 which is energized by a pulse generator 64 through a phase shifter 66, and the indexing information produced by the cathode-ray tube is supplied to the utilization circuits thereof through an amplifier 68 and a gating system 69, the latter being energized by the pulse generator 64 through a phase inverter 70.

The components 62, 64, 66, 68, 69 and 70 may be conventional in form. Thus the gate 62 may consist for example, of a dual grid thermionic tube having the anode thereof coupled to the control electrode 16, having one grid supplied with the video color wave and having a second grid coupled to the pulse generator 64 through the phase shifter 66. By means of appropriate bias potentials supplied to the control grids, the tube is maintained normally conducting and may be cut-off at selected intervals by means of a negative blocking potential supplied to the second grid thereof from the pulse generator 64.

The pulse generator 64 may consist of a free running multivibrator adapted to produce rectangular pulses of negative polarity with substantially equal mark-space ratios. The frequency of the pulses generated should preferably have a value equal to or greater than the maximum frequency of video color wave and in a typical case the generator 64 may have a frequency of approximately 31 mc./sec.

The phase shifter 66 in its simplest form may consist of a connecting cable having a length appropriate to produce a desired phase delay between the output of the generator 64 and the input of the gate 62, the amount of this phase delay being established as later to be pointed out. The amplifier 68 may consist of the combination of a conventional wide band amplifier adapted to operate without amplitude and phase distortion at frequencies of the order of the interruption frequency of the video wave, i. e. at 31 mc./s., whereas the gate 69 may consist of a dual grid tube having one grid coupled to the output of amplifier 68 and having the second grid thereof supplied with a negative potential which maintains the tube normally non-conductive. The tube may be made conductive in synchronism with the closing of the gate 62 by means of a gating signal of positive polarity which over-rides the negative blocking potential applied to the second grid thereof and which is derived from the pulse generator 64 through the phase inverter 70. Inverter 70 may consist of a single stage amplifier.

In operation, the color video wave supplied to the gate 62 is cyclically interrupted to form a continuous series of spaced pulses which recur at a repetition rate as established by the frequency of the generator 64. These pulses, which undergo amplitude variations as determined by the amplitude variations of the video wave, are supplied to the control electrode 16 and correspondingly vary the intensity of the cathode-ray beam to energize the image producing phosphors of the image screen. It will be noted that, since the interruption rate of the pulses is of the order of twice or more the maximum frequency of the video wave, there is no significant loss of image detail by the gating action.

During the periods between the pulses of the video color wave, the potential of the control electrode 16 is unaffected by the video wave and has a value established solely by the bias value supplied to the electrode 16 by potentiometer 18 so that the beam intensity has a constant value during these interruption periods. Accordingly there will be produced, across the load resistor 60 and at the output of amplifier 69, a signal comprising interleaved pulses which, during the conduction periods of the gate 62, have an amplitude as established by the amplitude of the video wave and which, during the intervening cut-off periods of the gate 62, have a constant amplitude as determined by the preestablished bias potential of the control electrode 16. These latter pulses are selectively derived by the gate 69 which is made conductive, as aforesaid, during the interruption periods of the video wave so that there is produced at the output of the gate 69 a series of spaced pulses having a fixed amplitude established solely by the bias potential of control electrode 16 and by the response of the indexing regions of the image screen. The so selected pulses, which recur in groups the spacing of which is determined by the rate of scanning of successive indexing regions of the image screen i. e. 7 million per second, may be converted into an indexing signal having variations corresponding to the rate of scanning the indexing regions by means of a bandpass filter 74 of conventional form and having a pass band in a typical case extending from 6 to 8 mc./sec.

By means of the phase shifter 66 transit time effects and phase delays occurring in the system may be compensated so that the gate 69 is actuated in synchronism with the occurrence of the fixed amplitude pulses appearing at the output of the amplifier 68.

The indexing signal at the output of filter 74 may be used in any conventional manner to control either the time phase position of the color video wave supplied to the image reproducing tube or the deflection velocity of the scanning system or both, so as to maintain a synchronous relationship between the color information supplied by the color video wave and the position of the image producing beam of the image reproducer.

In the arrangement specifically shown in Figure 1, this synchronous relationship is achieved by controlling the phase of the color video wave supplied to the image reproducer. More particularly, for supplying a properly phased color video wave to the tube 10, the system shown comprises a receiver 80 which may be of conventional design and include the usual radio frequency amplifier, frequency conversion and detector stages for deriving the color video signal produced at the transmitter. In a typical form the received color video signal comprises time spaced horizontal and vertical synchronizing pulses, which recur at the horizontal and vertical scanning frequencies, and the color video wave which occurs in the intervals between the horizontal pulses. The color video wave may comprise a first component having a relatively wide bandwidth and defining the brightness of the consecutively scanned image elements, and a second component in the form of a modulated subcarrier arranged at one end of the frequency spectrum of the first component and defining, with the first component, the chromaticity of the image elements. As a rule this subcarrier component is made up of two carrier signals of the same frequency and in phase quadrature, which signals are individually amplitude modulated by two color difference signals derived from the generated camera signals. One of these difference signals may be constructed to represent changes of the chromaticity of the image elements along one axis, i. e. the orange-cyan axis of the chromaticity diagram, and the other difference signal may be constructed to represent changes of the chromaticity of the image elements along a complementary axis, i. e. the magenta-green axis, of the chromaticity diagram.

In a typical case the first component of the color video wave may have a frequency spectrum extending from 0 to 3.5 mc./sec. and the color subcarrier component may have a frequency of approximately 3.89 mc./sec.

The incoming video signal may further include a marker signal for providing a phase reference for the color establishing component of the color video wave, such a marker being usually in the form of a burst of a small number of cycles of a carrier signal having a frequency equal to the frequency of the chromaticity subcarrier of the video wave and occurring during the so-called back porch interval of the horizontal scanning pulses.

The synchronizing pulses contained in the received video signal are selected by a sync signal separator 76 of conventional form, and subsequently energize, in well known manner, the horizontal and vertical scanning generators 32 and 34.

The video color wave is separated into its two components by means of a low pass filter 81 and a bandpass filter 83 whereby, at the output of filter 81, there is derived the low frequency component of the video wave containing the brightness information of the image, and, at the output of filter 83, there is derived the modulated subcarrier component of the video wave indicative of the chromaticity information of the image and the marker signal. The frequency pass bands of the filters 81 and 83 are selected in conformity with the standards of the transmission system, typical values for the pass bands of filters 81 and 83 being 0 to 3.5 mc./sec. for filter 81 and 3.5 to 4.3 mc./sec. for filter 83 when a subcarrier frequency of approximately 3.89 mc./sec. is used at the transmitter. The output signal of filter 81 is supplied to the gate 62 through an adder 82 having a plurality of inputs and a common output and consisting, in a typical case, of a plurality of thermionic tubes, the input circuits of which are separately energized by the respective input signals applied to the adder and the output circuits of which are supplied to a common load impedance.

The marker signal is separated from the video wave by means of a gated path operated in synchronism with the occurrence of the marker signal. For this purpose there is provided a burst separator 84 consisting, for example, of a dual grid thermionic tube having one control grid which is coupled to the output of tthe bandpass filter 83 and a second control grid so negatively biased as normally to prevent conduction through the tube. The tube is made conductive at the proper instant, i. e. during the backporch interval of the horizontal synchronizing pulses, by means of a positive pulse which may be derived from the output of the horizontal scanning generator 32 in well known manner and which is applied to the said second control grid to override the normal blocking bias. The burst separator may also contain a filter for attenuating undesirable signals at the output thereof—i. e. the separator may contain a resonant circuit which is tuned to the frequency of the marker signal and which is connected to the anode of the tube. Alternatively the burst separator may be of the form described and claimed in the copending application of Clem H. Phillips, Serial No. 345,307, filed March 30, 1953.

The marker signal so provided is applied to an oscillator 86 which is adapted to generate a signal having the frequency and phase position of the marker signal applied to the input thereof. In a suitable form the oscillator 86 may be of the type described in the copending application of Joseph C. Tellier, Serial No. 197,551, filed November 25, 1950.

The chromaticity information, contained on the 3.89 mc./sec. subcarrier component of the received video wave, is supplied to the gate 62 at a frequency of 7 mc./sec. by means of a heterodyne mixer 90 having its output circuit coupled to the adder 82 and having one input circuit thereof coupled to the bandpass filter 83. For bringing about this conversion of the frequency of the chromaticity signal and establishing the proper phase of the 7 mc./sec. chromaticity signal, the mixer 90 is additionally energized by a heterodyne mixer 88, one input circuit of which is supplied with the marker signal derived from the oscillator 86 and the second input circuit of which is supplied with the indexing information appearing at the output of bandpass filter 74.

The heterodyne mixers 88 and 90 may be of conventional form and may each consist of a dual grid thermionic tube, to the different grids of which the two input signals are supplied. The mixers may also include an output circuit broadly tuned to the frequency of the desired signal, whereby the desired heterodyne frequency signal may be preferentially selected.

The system operates to combine the marker reference signal at 3.89 mc./sec. with the indexing signal at a nominal frequency of 7 mc./sec. to produce a first heterodyne signal at a frequency of approximately 10.89 mc./sec. This heterodyne signal, it will be noted, exhibits, about a fixed phase reference established by the marker reference signal, the frequency variations determined by variations of the rate of scanning the indexing regions of the beam intercepting screen of the tube 10.

By means of the mixer 90 this heterodyne signal is in turn combined with the chromaticity information at 3.89 mc./sec. derived from the bandpass filter 83 to produce a second heterodyne signal at 7 mc./s., which signal exhibits the phase and amplitude variations of the chromaticity signal and the frequency variation established by the variations of the scanning rate of the indexing regions, and hence by the color triplets of the screen, these variations being established with reference to a given time phase position as determined by the color marker signal energizing the oscillator 86.

Figure 3:
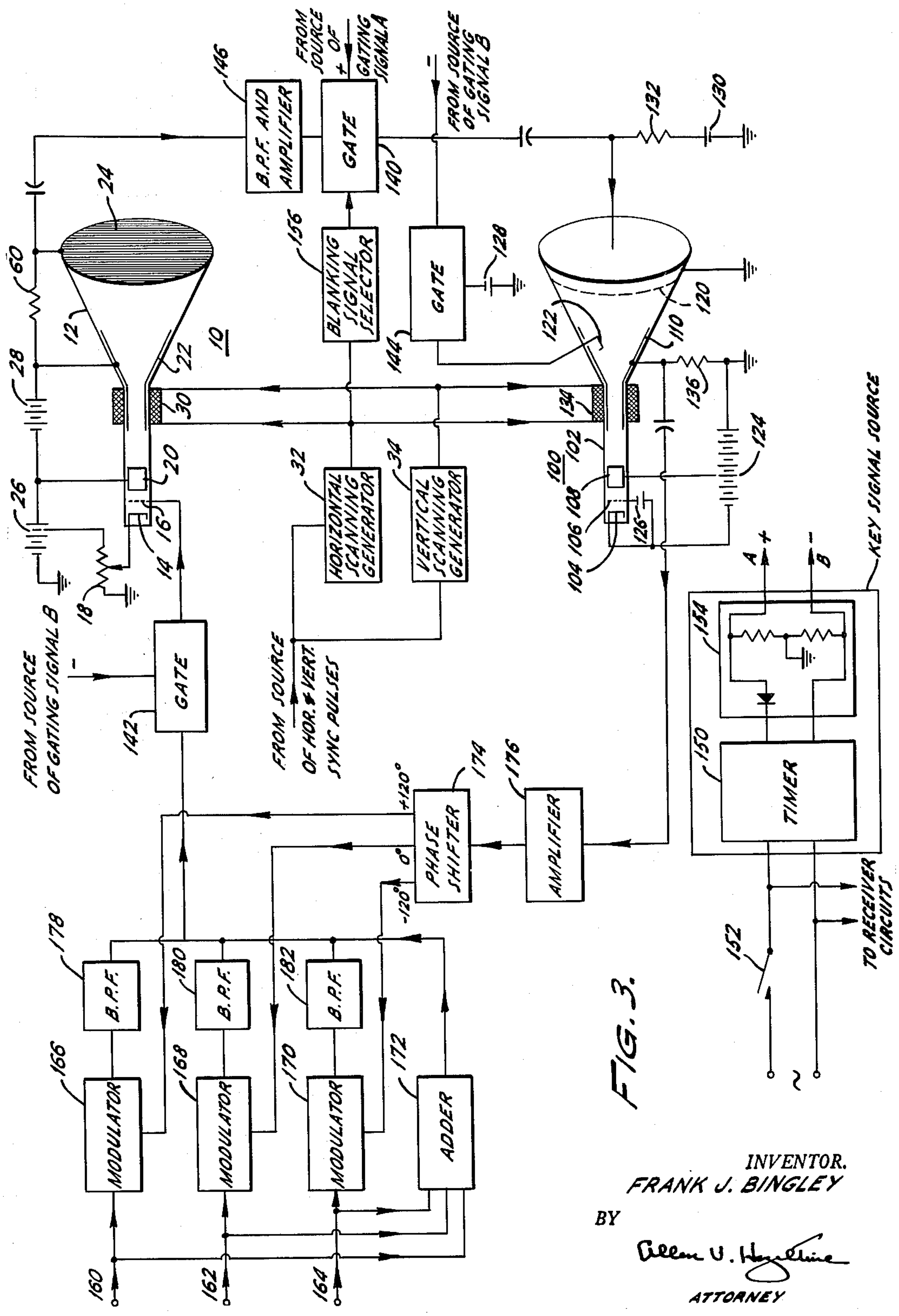
Figure 3 is a block diagram, partly schematic, showing a second embodiment of a cathode-ray tube system in accordance with the invention.

The embodiment of the invention shown in Figure 3 differs from that above described in the manner of interrupting the video color wave supplied to the image reproducer and in the utilization circuit for the indexing information produced during the interruption of the video color wave.

Many of the parts of the system of Figure 3 are similar in construction and mode of operation to those shown in Figure 1 and it is believed to be unnecessary to repeat the description thereof. These similar parts have been indicated by the same numerals. In the embodiment shown in Figure 3 the video color wave is interrupted at relatively less frequent intervals and the indexing signal produced by the indexing systems of the image reproducer is supplied to a signal storage tube, from which it may be recovered for subsequent use in a form clearly distinguished from any contaminating signals.

In one form the storage tube 100 may comprise an evacuated envelope 102 containing an electron beam generating and control system comprising a cathode 104, a control electrode 106, a focusing anode 108 and a beam accelerating electrode 110. At the end of the tube remote from the cathode 104 there is provided a charge storage target electrode system which, in a typical case, may be of the form shown in Figure 4. In the form there shown, the charge storage target system 112 comprises a dielectric layer 114, an electrically conductive layer 116 arranged against the face of the layer 114 remote from the cathode 104 and forming a back-plate for the layer 114, and a secondary electron emissive layer 118 arranged against the face of the layer 114 confronting the cathode 104.

The dielectric layer 114 may consist of a thin sheet of mica, glass or the like, and the conductive layer 116 may consist of a coating of a metal such as silver, or of aquadag, stannous oxide or the like, deposited on the surface of the layer 114. The secondary emissive layer 118 is preferably formed so as to exhibit a high electrical resistivity in a lateral direction, and for this purpose this layer may be constituted of an electrical insulating material, exhibiting secondary emissive properties, such as magnesium oxide, beryllium oxide or calcium tungstate. Alternatively the layer 118 may consist of a layer of a secondary electron emissive material exhibiting low electrical resistivity, such as cesium oxide, in which case the layer is preferably formed as a mosaic, the desired lateral resistivity being achieved by the physical spacing between adjacent particles of the mosaic structure.

Arranged adjacent to the secondary electron emissive layer 118 is a barrier grid 120 in the form of a metal grid or mesh operated at ground potential and serving to prevent rediffusion of electrons emitted by surface 118.

The storage tube further comprises a second source of electrons shown as a cathode 122 arranged in the vicinity of the target electrode system beyond the beam deflection system of the storage tube. Cathode 122 is adapted to direct a spray or substantially uniform flood of electrons upon the surface of the emissive layer 118, and thereby serves as a charge holding electron source for the charge pattern formed on the target structure 112.

The storage tube 100 is energized by suitable voltage sources shown as batteries 124, 126, 128 and 130, the battery 124 being connected with its negative terminal to cathode 104 and being adapted to apply positive potentials to the focusing anode 108 and to the accelerating electrode 110. Source 126 provides a biasing voltage for the control electrode 106, thereby adjusting the intensity of the electron beam emitted by cathode 104. Source 128 provides an accelerating voltage for the spray of electrons emitted by the cathode 122, and source 130 establishes the operating potential of the target system 112 by applying a positive potential to the back plate 116 through an isolating resistor 132. For the sake of circuit clarity, the sources 124 and 128 have been shown separate from the sources energizing the tube 10 and operated with their positive poles at ground potential. However, it is evident that a common supply may be used for both tubes and that this supply may be connected with either its negative pole or its positive pole at ground potential as determined by the overall design of the system. The use of a common supply has the advantage that changes in the potential value thereof, such as are brought about by aging of the components, affect both of the tubes equally.

A deflection yoke 134 of conventional form is provided for scanning the electron beam of tube 100 across the target electrode system to form a raster thereon. The deflection of the beam of tube 100 is made to occur in synchronism with the deflection of the beam of tube 10 by supplying the yoke 134 thereof from the horizontal and vertical scanning generators 32 and 34 energizing the yoke 30.

The signal to be stored is supplied to the charge storage system of the tube 100 by means of a conductor connected to the back plate 116. The desired output signal of the tube 100 may be derived from the anode 110 which may serve as a collector electrode, and for this purpose the anode 110 is provided with a load impedance 136.

The principles of operation of a storage tube of the type above described are well known to those skilled in the art and are set forth, for example, in the publication "Storage Tubes and Their Basic Principles" by M. Knoll and B. Kazan published by John Wiley and Sons, Inc., New York, 1952. Briefly summarizing the pertinent aspects, it is pointed out that, during the so-called "writing" period, an electron charge pattern may be formed on the surface of the secondary emissive layer 118 of the target system by the action of the scanning beam from the cathode 104 and by the signal variations applied to the back plate 116 during this period. The information so stored on the surface of the secondary electron emissive layer 118 may thereafter be "read" by again scanning this surface with the beam from the cathode 104, and the information so produced may be derived from the tube 100 by the collector electrode 110 and appears across the load impedance 136. The subsequent scanning of the charge pattern formed on the secondary electron emissive layer 118 normally tends to erase the information initially stored thereon. However, this effect may be avoided by simultaneously spraying the surface of the layer 118 with electrons from the cathode 122 which provides a "holding" beam for the charge pattern.

The system shown in Figure 3 operates to supply the storage tube 100 with indexing information, free from video information, during a given time interval, at which time the video color wave applied to the image reproducer is interrupted, and subsequently to utilize the so stored information to achieve the desired phasing of the video information supplied to the image reproducing tube 10. This time interval may occur at the beginning of the program period or may occur periodically during the program period. For this purpose the indexing signal produced by the tube 10 is supplied to the tube 100 through a gate 140, the control electrode 16 of the tube 10 is supplied with video information through a gate 142, and the cathode 122 of tube 100 is connected to its energizing source 128 through a gate 144. An amplifier 146 of conventional design may be arranged between the output of tube 10 and the gate 140 to amplify the indexing signals from the tube 10 to a conveniently usable level.

Gate 140 may consist of a dual grid tube having the anode thereof coupled to the target of the charge storage tube, having one grid coupled to the output of amplifier 146, and having the second grid thereof supplied with a negative potential which maintains the gate normally closed. The gate may be opened at selected periods by means of a gating signal of positive potential overriding the negative blocking potential applied to the second grid thereof, thereby to transmit the indexing information from the image tube 10 to the storage tube 100 during these periods.

The gate 142 may similarly consist of a dual grid tube having the anode thereof coupled to the control electrode 16 of tube 10, having one grid thereof energized by the video signal to be reproduced, and having the second grid energized by a gating signal. The gate 142 is maintained normally open and is adapted to be closed at selected periods by means of a gating signal having a negative potential of sufficient value to produce cut-off in the tube and thereby to remove the video signal from the control electrode 16 during these periods.

Gate 144 may be similar to the gate 142 and operates in the same manner as gate 142. Thus gate 144 is normally open and is adapted to be closed at selected periods by means of a negative going gating signal applied to the second grid thereof, thereby to deenergize the cathode 122 during these periods.

For actuating the gates 140, 142 and 144, the receiver may be provided with a timer mechanism 150 which is energized by the "turn on" switch 152 of the receiver and which, after an interval sufficient to bring the circuits of the receiver into operation, momentarily energizes a rectifier system 154 adapted to produce a signal A of positive potential of sufficient magnitude to override the normal blocking potential of gate 140 and to produce a signal B of negative potential of sufficient magnitude to produce cut-off of the gates 142 and 144. It is thus seen that, during the period that the rectifier 154 is energized, the path between the indexing structure of tube 10 and storage tube 100 is completed, the path of the video signal to the tube 10 is cut off, and the cathode 122 of the tube 100 is deenergized. Accordingly the indexing information generated by the tube 10 during this interval is free from the video information normally impressed on the control electrode 16, and this indexing information is written into the storage tube 100 without being influenced by the auxiliary cathode 122.

This "writing" period need have only a relatively short duration of the order of one or more frame scanning periods and is terminated by the action of the timer 150 which, as above pointed out, only momentarily energizes the rectifier 154. After the "writing" period the gate 140 is cut-off and prevents further information from passing from the tube 10 to the tube 100, the gate 142 becomes conductive and allows video information to reach the control electrode 16 of tube 10 and the gate 144 becomes conductive thereby energizing the auxiliary cathode 122 which "holds" the stored charge pattern on the target system of tube 100 notwithstanding successive scannings of the target by the beam from the main cathode 104.

It may be desirable periodically to renew the indexing information written into the storage tube 100 so as to insure valid indexing information irrespective of possible changes of the operating characteristics of the receiver. For example, if the receiver is subject to voltage supply fluctuations tending to change the size of the image produced by the image tube 10, it may be desirable to renew the indexing information written into the storage tube to make it conform to that required by the tube 10 under its new operating condition. This may be achieved by means of a timer 150 adapted to energize momentarily the rectifier system 154 at the desired periodicity. Since the indexing information may be written into the storage tube within a relatively short time of the order of a few frame scanning periods, the loss of picture information during this short interval is not generally sufficient to be objectionable. Suitable forms of timers for this purpose, comprising, for example, multivibrator actuated counter type systems energized by the vertical and/or horizontal synchronizing pulses of the video wave, will readily suggest themselves to those skilled in the art, and a further description of the same is believed to be unnecessary.

During the writing period of the system above described the video signal is cut-off from the control electrode 16. Therefore the retrace signal, normally blocking the beam of the tube 10 during the retrace period, is also cut off so that the beam may impinge on the indexing regions of the structure 40 of tube 10 during the retrace periods and contaminate the desired indexing information. To avoid this possibility, the system of Figure 1 further comprises a blanking signal selector 156 which is coupled to the horizontal scanning generator 32 and is adapted to supply a negative voltage pulse to the gate 140 i. e. to the second grid thereof, thereby closing the gate during the retrace periods. In a suitable form selector 156 may comprise a diode element so poled as to select the negative flyback pulse normally existing in the circuits of the horizontal scanning generator.

The indexing signal produced by the storage tube 100 may be used to control the time phase position of the video information supplied to the tube 10 in the manner previously described in connection with Figure 1 or in any other well known manner. In the arrangement shown in Figure 3, the indexing information serves as a signal for energizing a modulation system adapted to apply three color signals to the image tube 10 in proper sequence and time phase position.

More particularly, for producing the color image on the faceplate of the cathode-ray tube 10, there are provided three signal input terminals 160, 162 and 164 which are supplied from a television receiver (not shown) with separate signals indicative of the red, green and blue components of the televised scene, respectively. The system then operates effectively to convert these three color signals into a wave having the color information arranged in time reference sequence so that the red information occurs when the cathode-ray beam impinges the red stripes 44 of the beam intercepting structure 40 (see Figure 2), the green information occurs upon impingement of the green stripes 46 and the blue information occurs when the blue stripes 48 are impinged.

The conversion of the color signals into a wave having the color information arranged in time reference sequence may be achieved by energizing the modulation system with the respective color signals and with appropriately phase related modulating signals. In the arrangement shown in Figure 3, the modulation system comprises sine wave modulators 166, 168 and 170 and an adder 172. Modulators 166, 168 and 170 may be of a conventional form and may each consist, for example, of a dual grid thermionic tube, to one grid of which is applied the color signal from one of terminals 160, 162 and 164 and to the other grid of which is applied an individual modulating signal. The modulating signals may be derived from a phase shifter 174 which is energized by the output of storage tube 100 through an appropriate amplifier 176 if necessary, and is adapted to produce, by means of suitable phase shifting networks, three modulation voltages appropriately phase displaced. In the arrangement specifically described, wherein the phosphor stripes 44, 46 and 48 (see Figure 2) are uniformly distributed throughout the width of each color triplet, the modulation voltages from the phase shifter 174 bear a 120° phase relationship as shown. The individual waves produced at the outputs of the modulators will be sine waves, each amplitude modulated by the color signal applied to the respective modulators and each having a phase relationship determined by the particular modulation signal applied to the respective modulators. The three modulators are coupled with their outputs in common to produce a resultant wave having a frequency corresponding to that of the indexing signal applied to the phase shifter 174, and having amplitude and phase variations proportional to the variations of the amplitudes of the color signals at terminals 160, 162 and 164.

Each of the color signals applied to the input terminals 160, 162 and 164 will, in general, include a reference level component definitive of brightness. While each of the modulators above specifically described normally transmits this reference level component to its output, it is preferable to suppress the individual reference level components from the modulators, for example by means of bandpass filters 178, 180 and 182 respectively, and to process the brightness information in a separate channel. Accordingly, in the system shown in Figure 3, the three color signals are combined in the adder 172 in proper proportions to produce a single signal representative of the overall brightness of the image elements to be reproduced, and this signal is in turn combined with the outputs of the modulators.

Figure 5:
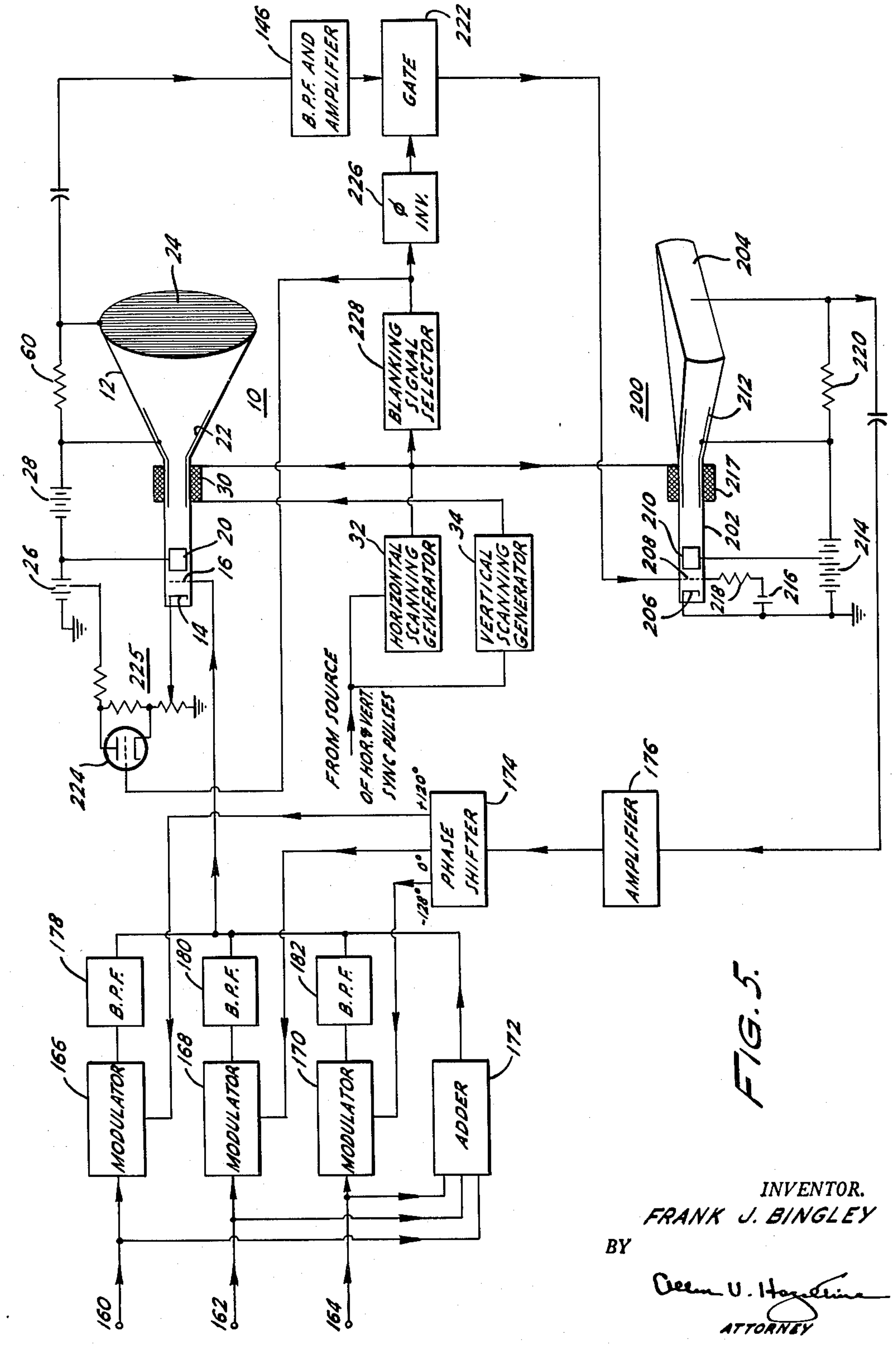
Figure 5 is a block diagram, partly schematic, showing another embodiment of a cathode-ray tube system in accordance with the invention.

Figure 5 illustrates an embodiment of the invention making use of a storage tube having a relatively short memory, and in which the indexing information is renewed at the end of each scanning line period of the image to be reproduced at which times the video color wave applied to the control electrode 16 is interrupted by the blanking intervals occurring between the horizontal scansion periods. In Figure 5, those components of the system which operate in the same manner as the corresponding components of the system of Figures 1 and 3 have been indicated by the same numerals.

The system shown in Figure 5 comprises a color image reproducing tube 10, the beam intercepting structure of which is adapted to generate indexing information as previously described in connection with the tube 10 of the system of Figure 1, a gating system later to be described, a storage tube 200, and a modulation system energized by the indexing signal output of the storage tube and adapted to supply the color image information to the tube 10 in proper time phase sequence.

The storage tube 200 may be similar to the storage tube 100 previously described. However, since the tube is required to store only one line of indexing information at a time, and since this information needs to be stored only for an interval equal to the period of one line scansion, the tube 200 may be made considerably more simple than the tube 100.

More particularly, tube 200 may comprise an evacuated envelope 202 having a rectangular end face 204, the vertical dimension of which may be considerably smaller than the horizontal dimension thereof. Tube 200 is provided with a source of an electron beam comprising a cathode 206, an intensity control electrode 208, a focusing electrode 210 and an accelerating electrode 212. Additionally contained within the tube 200, and arranged transverse to the axis of the beam, is a charge pattern storage system which may be constructed similarly to the system 112 shown in Figure 4, and which may have surface dimension conforming to those of the faceplate 204.

The focusing and accelerating electrodes 210 and 212 are energized in conventional manner by a source shown as battery 214, whereas the control electrode 208 is supplied with a biasing potential, for example from a battery 216 connected thereto through a resistor 218. The desired output indexing signal may be derived from the backing plate of the charge storage system and, for this purpose, this plate is connected to the positive potential point of battery 214 through a load impedance 220.

The beam of the tube 200 is deflected solely in the horizontal direction and, for this purpose, the tube is provided with a horizontal deflection coil 217 which is coupled to the horizontal deflection generator for the beam of the tube 10 so that both beams move in synchronism across their respective beam intercepting structures.

Information may be written into the storage tube 200 by varying the intensity of the beam under the control of electrode 208 during the scanning of the charge storage target. More particularly, when the intensity of the beam is varied by an appropriate signal applied to control electrode 208, consecutively scanned portions of the secondary emissive surface of the target system assume charge potentials having a pattern corresponding to the intensity variations of the beam during the writing period. This charge pattern remains relatively fixed until such time as the beam again scans the surface of the target. At this time the stored charges assume new values as determined by the intensity of the beam during the subsequent scanning of the target. When the second scansion of the target is effected by a beam of constant intensity, the charges initially stored on the target surface are progressively erased and at the same time there is produced, at the backing plate of the target and across the load impedance 220, a signal having amplitude variations as determined by the charge pattern initially formed on the target surface during the first scanning period.

The system of Figure 5 operates to write the desired indexing information into the storage tube 200 during the horizontal flyback periods of the scanning beams, during which times the video color wave is interrupted, and to read the desired indexing information out of the storage tube during the forward horizontal scanning periods. For this purpose the indexing structure of tube 10 is coupled to the control electrode 208 of the storage tube 200 through a gate 222 which is open during the flyback intervals (at which time the color video wave supplied to control electrode 16 of tube 10 is interrupted) and is cut off during the forward horizontal scanning periods.

The desired indexing information, free from video information, is derived from the tube 10 during each flyback period, at which time the beam of tube 10 has a constant intensity value, and is supplied through the gate 222 to the control electrode 208 to produce a corresponding charge pattern at the target of the storage tube 200. It will be noted that, since the beams of tubes 10 and 200 move in synchronism by reason of their being controlled by signals from the common horizontal scanning generator 32, the charge pattern formed on the target of the tube 200 has a configuration identical to the configuration of the indexing regions of the beam intercepting structure of tube 10.

At the end of the flyback period, the gate 222 is closed and the intensity of the beam of tube 200 assumes a constant value as determined by the bias potential applied to control electrode 208. During the forward scanning period, the beam of tube 200 scans across the surface of the target and progressively erases the charge pattern. At the same time this beam produces, across the impedance 220, an output indexing signal having variations corresponding to the charge pattern initially formed on the target. At the end of the forward scanning period, the gate 222 is opened so that, during the succeeding flyback period, the indexing information from the next scanning line of the beam intercepting structure of the tube 10 is supplied to the target of the storage tube.

The output signal from the storage tube 200 may be used to control the time phase position of the video information applied to tube 10 in the same manner as in the system above described with reference to Figure 3—i. e., the indexing signal so produced may be used to energize modulators 166, 168 and 170 through the intermediary of a phase shifter 174 and an amplifier 176.

In practice it is desirable to adjust the potential of the control electrode 16 of the tube 10 to a fixed predetermined value during the flyback period so that, during this period, a beam is produced at an intensity sufficient to energize the indexing regions of the beam intercepting structure without significantly illuminating the image forming components of the screen structure. Such an expedient may be necessary in order to avoid extinction of the beam which would normally be produced by the blanking pedestal of the video wave. To achieve this result there may be coupled to the cathode 14 a gated brightness control system 224 adapted to vary the cathode potential in a sense to compensate the negative going change of the control electrode 16 during the blanking interval of the video wave. In a typical form, the control system 224 may consist of a triode thermionic tube having the cathode and anode thereof shunting a portion of the potentiometer network 225 normally included in the cathode circuit of the tube 10 for establishing the operating bias thereof.

The tube 224 is normally conductive so that, during the forward scanning period, the cathode has a predetermined potential established by the tapping point of the cathode terminal of the potentiometer and by the shunting effect of the tube 224. However, during the flyback period, tube 224 is cut off by a suitable negative pulse supplied to the control grid thereof, thereby causing the potential of cathode 14 to become less positive and thereby compensating the negative going change of the potential of the control electrode 16 during this interval brought about by the blanking signal component of the video wave.

The gates 222 and 224 may be actuated by appropriate keying signals derived from the horizontal scanning generator 32 during the flyback period. More particularly, by means of a blanking signal selector 228 similar to the selector 154 of the system of Figure 4, there may be derived, from the generator 32 during the flyback interval, a negative pulse serving to cut off the tube 224 during this interval. By means of a phase inverter 226, the pulse so obtained may be supplied in proper polarity to open the gate 222 during the flyback period.

Figure 6:
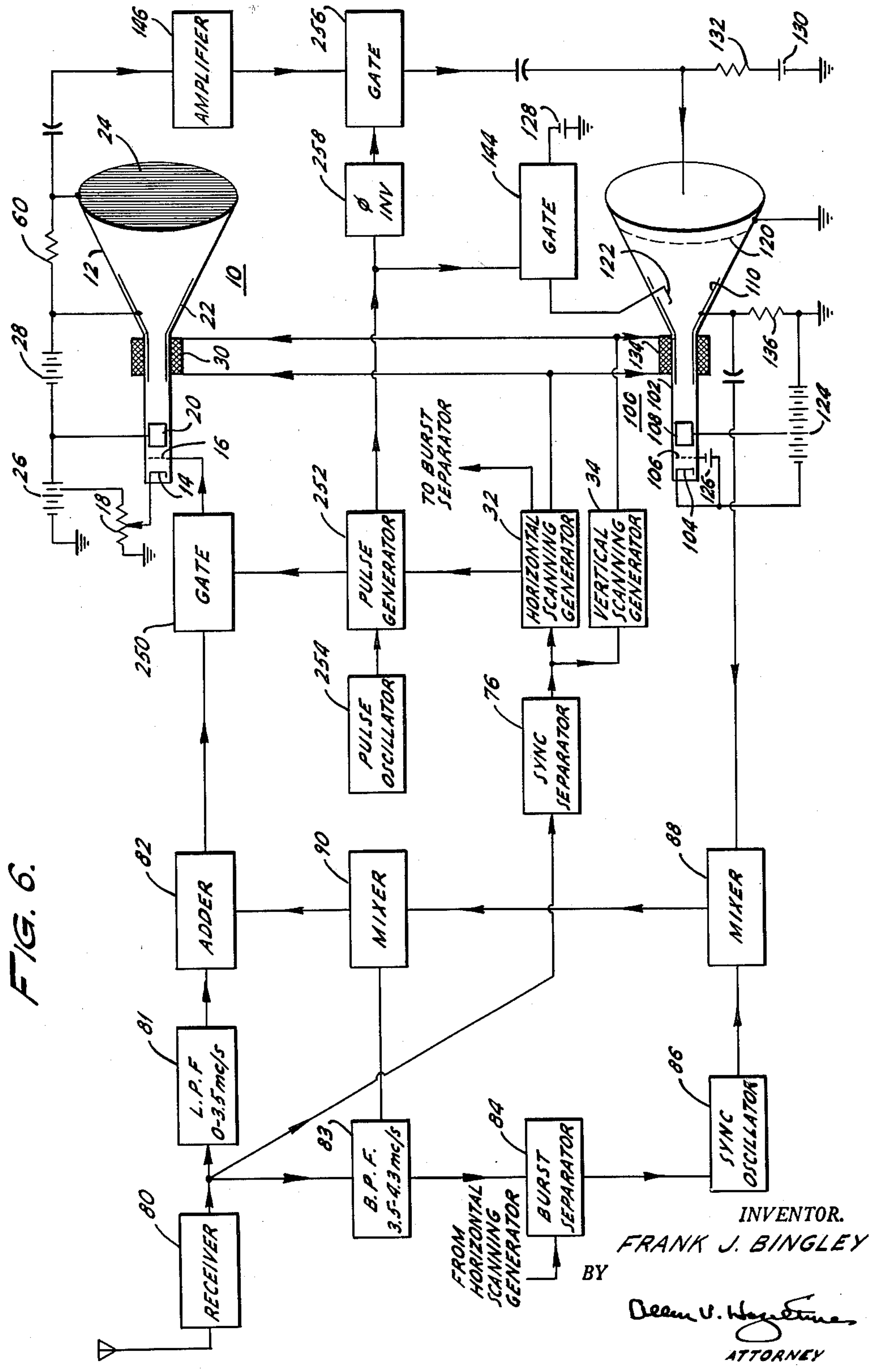
Figure 6 is a block diagram, partly schematic, showing a further embodiment of a cathode-ray tube system in accordance with the invention.

In the embodiment of the invention shown in Figure 6, the video color wave supplied to the image reproducer is periodically interrupted for an interval equal to one line scanning period during which times indexing information free from video components is derived from the image reproducing tube and supplied to a storage tube. These interruptions are effected at a frequency which differs from the field scanning frequency so that during successive image fields a different horizontal scanning line of the image is interrupted. Accordingly, after a given time interval, as established by the field frequency and the interruption rate, a complete raster of the indexing information is supplied to the storage tube. In the arrangement shown, the video color wave is supplied to the control electrode 16 of the image reproducer 10 through a gate 250 which is normally conductive and is adapted to be closed at selected intervals by a gating signal derived from a pulse generator 252. Gate 250 may be identical in construction to the gate 142 of the system of Figure 3 and may consist of a dual grid tube having the anode thereof coupled to the control electrode 16 of the tube 10, having one grid thereof energized by the color video wave to be reproduced and having the second grid energized by the gating signal from the pulse generator 252, which gating signal has a negative potential of sufficient value to produce cut-off in the tube.

The pulse generator 252 may comprise a dual grid tube having the anode thereof coupled to the second grid of the gate 250, having a first grid supplied with positive going pulses having a duration equal to the line scanning period, which pulses may be derived in well known manner from the horizontal scanning generator, and having the second grid thereof supplied with a negative potential which maintains the tube normally in a cut-off condition. The tube is made conductive at selected periods by means of a positive going pulse signal which is supplied to the second control grid from a pulse oscillator 254 and which has a duration of the order of one line scanning period. The pulse oscillator 254 may be of conventional form and may consist, for example, of a so-called blocking oscillator of the type shown in Figure 135, page 183 of the publication "Television Engineering" by Donald G. Fink; McGraw-Hill Book Co., New York, 1952. Alternatively the oscillator 254 may consist of a free running multivibrator. The constants of the oscillator 254 are selected so that the frequency thereof differs slightly from the field scanning rate—i. e. the oscillator may have a pulse repetition rate of approximately 50 times per second so that the negative going pulse produced by the generator 252 causes different horizontal lines of the color video wave to be interrupted. By reason of the difference between the field scanning rate and the frequency of the oscillator 254, the gray line produced by the interruption of the video color wave is made to move rapidly down the image raster so as to be interceptible to the eye and, in about eight seconds, every line in the picture will have been affected once.

During the interruption periods so produced, the cathode ray beam of the tube 10 is preferably maintained at a constant intensity and this may be affected by an appropriate adjustment of the setting of the potentiometer 13.

The indexing information produced during the interruption periods of the color video wave is separated from indexing information generated during the intervening intervals by means of a normally closed gate 256 consisting, for example, of a dual grid tube having one grid coupled to the output of amplifier 146, and having the second grid thereof supplied with a negative potential which maintains the gate normally closed. The gate may be opened for one line scanning period at selected intervals by means of a gating signal of positive potential overriding the negative blocking potential applied to the second grid thereof and derived from the pulse generator 252 through a phase inverter 258. The indexing signal, free from video information, thus produced at the anode of the dual grid tube of gate 256 may then be applied to a storage tube 100 of the type shown in the system of Figure 3. As in the case of the system of Figure 3, the storage tube 100 is adapted to store the indexing information supplied thereto during the so-called "writing" periods in the form of an electron charge pattern. This information may thereafter be "read" by scanning the charge storage surface with the beam from the cathode 104, and the erasure thereof during these periods is prevented by the auxiliary cathode 122.

It will be seen from the foregoing that, during the selected interruption periods of the video color wave, there is supplied to the storage tube, via the gate 256, one line scan of the desired indexing signal. At this time, and in order that this indexing information may be written into the tube 100, the auxiliary cathode 122 is cut-off by the gate 128 as previously described in connection with Figure 3. This gate, in the system of Figure 6, is actuated by the negative going blocking pulse derived from the pulse generator 252. During the remainder of the field scanning period, i. e. during the intervals between interruptions of the video color wave, the indexing information previously stored in the tube 100 is read off by the beam from cathode 104 and appears across the load resistor 136.

The indexing information appearing across the load resistor 136 may be used in any of several ways and, in the arrangement shown in Figure 6, this information is combined with the received color video wave in the manner also shown in Figure 1. More particularly, by means of the mixer 88, indexing information is combined with a color reference signal derived from the sync oscillator 86 which in turn is energized by the burst separator 84 coupled to the output of the bandpass filter 83 serving to derive the modulated subcarrier component of the color video wave appearing at the detector of receiver 80. The output of mixer 88 is supplied to the mixer 90 in which it is combined with the color subcarrier derived from the bandpass filter 83. Mixer 90 supplies the adder 82 which combines the mixer signal with the brightness signal derived from the low pass filter 81 to produce the video color wave supplied to the gate 250.

While, in the embodiments of the invention hereinbefore described, a signal storage tube embodying a target system on which the desired information is stored in the form of a charge pattern has been illustrated, it will be evident to those skilled in the art that storage tubes embodying target systems which undergo changes in dielectric constant, magnetic permeability or the like, and by means of which the desired indexing information may be stored, are also applicable for the purposes of the invention. Furthermore while, in the preferred embodiments specifically described, the stored indexing information serves to vary the time phase position of the video information supplied to the intensity control electrode of the cathode-ray image tube thereby to control the contemporaneous value thereof relative to the position of the beam, it is evident that the desired relationship between the video information and the position of the beam may also be adjusted by directly controlling the beam position during the scanning interval, for example by means of a frequency controlling system coupled to the horizontal scanning oscillator and energized by the indexing information derived from the storage tube.

From the foregoing description, it will be seen that the invention provides an improved indexing system for establishing the position of the beam of the image reproducing tube 10 and for generating an indexing signal adapted to control the time phase position of the video information applied to the tube 10 relative to the position of the beam. This indexing signal is produced without contamination by the video information so that its action is positive and clearly defined.

While I have described my invention by means of specific examples and in specific embodiments, I do not wish to be limited thereto for obvious modifications will occur to those skilled in the art without departing from the spirit and scope of the invention.

What I claim is:

1. A cathode-ray tube system comprising: a cathode-ray tube having a member adapted to intercept charged particles, comprising a plurality of first spaced-apart portions arranged in a given geometric configuration and adapted to produce a first given response upon impingement by said particles, said member further comprising a plurality of second portions arranged in a second given configuration indicative of said first configuration and distributed throughout the area occupied by said first portions in the spaces between said first portions, said second portions being adapted to produce a second given response different from said first given response upon impingement by said particle; said cathode ray tube further comprising means for generating charged particles and for directing the same in beam formation toward said intercepting member and control means for varying the flow of said particles from said generating means; means for applying to said control means a wave having, during first given time intervals, variations indicative of desired variations of said first portions and having, during second given time intervals, a substantially constant amplitude value; means for scanning said charged particles in beam formation across said intercepting member thereby to energize said first and second portions and produce a first control signal determined by the response to said charged particles; and means for interrupting said control signal during said first given time intervals thereby to produce a second control signal determined by the response of said second portions and by the intensity of said wave during said second time intervals.

2. A cathode-ray tube system as claimed in claim 1 wherein said means for interrupting said first control signal comprises means for cyclically interrupting said signal at a rate substantially equal to the rate of scanning said first and second portions.

3. A cathode-ray tube system as claimed in claim 1 further comprising an electrical signal storage device, means for applying said second control signal to said storage device while simultaneously scanning said beam intercepting member thereby to record into said storage device a signal storage pattern determined by said second control signal and having variations corresponding to the configuration of said second portions, and means operative in synchronism with the scanning of said beam for deriving from said storage device a third control signal having variations determined by said storage pattern.

4. A cathode-ray tube system as claimed in claim 1 further comprising an electrical signal storage device comprising a signal storage target system and a source of a beam of charged particles for energizing said target system, means for scanning said last mentioned beam over said target system in synchronism with the scanning of said first mentioned beam over said beam intercepting member, means for applying said second control signal to said storage device while simultaneously scanning the said target system thereby to produce at said target system a signal storage pattern determined by said second control signal and having variations corresponding to the configuration of said second portions, and means for deriving from said storage device a third control signal having variations determined by said storage pattern during the scanning thereof by the said beam of said storage device.

5. A cathode-ray tube system as claimed in claim 1 further comprising means responsive to said second control signal for varying the relative time phase position between the said wave and the position of said beam on said beam intercepting member.

6. A cathode-ray tube system as claimed in claim 1 wherein said means for applying said wave to said control means comprises a source of a second wave having amplitude variations indicative of desired variations of the response of said first portions and means for cyclically interrupting said second wave, and wherein said means for interrupting said first control signal comprises means operative in synchronism with the interruption of said second wave.

7. A cathode-ray tube system as claimed in claim 6 wherein said means for scanning said charged particles in beam formation comprises means for scanning said charged particles in a first direction across said beam intercepting member at a first given rate and for scanning said particles in a second direction transverse to said first direction at a second given rate greater than said first rate, wherein said means for interrupting said second wave comprises means for cyclically interrupting said second wave at a third given rate approximating said first given rate for a duration substantially equal to the scanning duration in said second direction, and wherein said means for interrupting said control signal comprises means for interrupting said control signal at said third given rate and for a duration substantially greater than the scanning duration in said second direction.

8. A cathode-ray tube system, for producing a color television image, comprising: a cathode-ray tube having an electron beam intercepting member comprising first spaced-apart portions of phosphor material arranged in a given geometric configuration and adapted to produce light of different colors in response to electron impingement, said intercepting member further comprising second portions arranged in a second geometric configuration indicative of the geometric configuration of said first portions and distributed througout the area occupied by said first portions in the spaces between said first portions, said second portions being adapted to produce a given response upon electron impingement; said cathode ray tube further comprising a source of an electron beam and means for controlling the intensity of said beam; means for producing a color video wave having amplitude variations indicative of desired variations of the response of said first portions; means for cyclically varying the amplitude of said color video wave to a given amplitude value and for applying said varied wave to said beam intensity controlling means; means for scanning said beam across said beam intercepting member thereby to energize said first and second portions and to produce a first control signal having an amplitude determined by the intensity of said beam and by the response of said second portions; means operating in synchronism with the said cyclically varying means of said color video wave for deriving from said first control signal a second control signal having an amplitude as determined by the said given amplitude value of said varied wave and by the response of said second portions; and means responsive to said second control signal for varying the relative time phase position between the said video color wave and the position of the said beam on said beam intercepting member.

9. A cathode-ray tube system as claimed in claim 8 wherein said color video wave has a frequency spectrum extending to a given maximum frequency value and wherein said cyclical variations of the amplitude of said color video wave recur at a rate greater than the said maximum frequency value.

10. A cathode-ray tube system as claimed in claim 8 wherein said beam scanning means comprise means for scanning said beam over said beam intercepting member in a first given direction at a first given rate and for scanning said beam over said member transverse to said given direction at a second rate greater than said given rate, and wherein said cyclical variations of the amplitude of said color video wave recur at a rate different from said first given rate and less than said second rate.

11. A cathode-ray tube system as claimed in claim 8 wherein said means responsive to said second control signal comprises an electrical signal storage device comprising a signal storage target system and a source of an electron beam for energizing said target system, means for scanning said last mentioned beam across said target system in synchronism with the scanning of said first mentioned beam over said beam intercepting member, means for applying said second control signal to said storage device while simultaneously scanning said target system with said second mentioned beam thereby to produce at said target system a signal storage pattern determined by said control signal and having variations corresponding to the configuration of said second portions, and means for deriving from said storage device an output control signal having variations determined by said signal storage pattern during the scanning thereof by the said beam of said storage device.

12. A cathode-ray tube system comprising, a cathode-ray tube having a member adapted to intercept charged particles and comprising a plurality of first portions arranged in a given geometric configuration and adapted to produce a first given response upon impingement by said particles, said member further comprising a plurality of second portions arranged in a second given configuration indicative of said first configuration and adapted to produce a second given response different from said first given response upon impingement by said particles, said cathode ray tube further comprising means for generating charged particles and for directing the same in beam formation towards said intercepting member and control means for varying the flow of said particles from said generating means, means for applying to said control means a wave having variations indicative of desired variations of the response of said first portions, means for scanning said charged particles in beam formation across said intercepting member thereby to energize said first and second portions and to produce a first control signal determined by the response of said second portions, an electrical signal storage device comprising a signal storage target system and a source of a beam of charged particles for energizing said target system, means for scanning said last mentioned beam over said target system in synchronism with the scanning of said first mentioned beam over said beam intercepting member, means for applying said control signal to said storage device while simultaneously scanning the said target system thereby to produce at said target system a signal storage pattern determined by said control signal and having variations corresponding to the configuration of said second portions, means for deriving from said storage device a second control signal having variations determined by said storage pattern during the scanning thereof by the said beam of said storage device, and means responsive to said second control signal to vary the relative time phase position between the said wave and the position of said first mentioned beam on said beam intercepting member.

13. A cathode-ray tube system as claimed in claim 12 wherein said target system comprises means to store said first control signal in the form of an electrical charge pattern.

14. A cathode-ray tube system as claimed in claim 12 wherein said means to vary the relative time phase position between the said wave and the position of said first mentioned beam comprises means to vary the time phase position of said wave.

15. A cathode-ray tube system as claimed in claim 12 wherein said means for applying said control signal to said storage device comprises a transmission path interconnecting said beam intercepting member and said storage device, and means responsive to said scanning means for periodically interrupting said transmission path.

16. A cathode-ray tube system as claimed in claim 12 wherein said wave applied to said control means of said cathode-ray tube comprises a component varying the flow of said charged particles during recurrent spaced time intervals, and said means for applying said control signal to said storage device comprises means to energize said storage device during time intervals between said recurrent intervals.

17. A cathode-ray tube system as claimed in claim 12 wherein said wave applied to said control means of said cathode-ray tube comprises a component varying the flow of said charged particles during a given time interval, and said means for applying said control signal to said storage device comprises means for energizing said storage device during a time interval different from said given time interval.

18. A cathode-ray tube system as claimed in claim 17 wherein said means for energizing said storage device comprises a transmission path interconnecting said beam intercepting member and said storage device and means to actuate said transmission path substantially at the start of the period of operation of the cathode-ray tube system.

19. A cathode-ray tube system for producing a color television image, comprising a cathode-ray tube having an electron beam intercepting member comprising first portions of phosphor material arranged in a given geometric configuration and adapted to produce light of different colors in response to electron impingement, said intercepting member further comprising second portions arranged in a second geometric configuration indicative of the geometric configuration of said first portions and adapted to produce a given response upon electron impingement, said cathode ray tube further comprising a source of an electron beam and means for varying the intensity of said beam, means for applying to said intensity varying means a wave having variations indicative of desired variations of the response of said first portions, means for scanning said beam across said beam intercepting member thereby to energize said phosphor stripes and said second portions and to produce a first control signal as determined by the response of said second portions, an electrical signal storage device comprising a signal storage target system and a source of an electron beam for energizing said target system, means for scanning said last mentioned beam across said target system in synchronism with the scanning of said first mentioned beam over said beam intercepting member, means for applying said control signal to said storage device while simultaneously scanning the said target system with said second mentioned beam thereby to produce at said target system a signal storage pattern determined by said control signal and having variations corresponding to the configuration of said second portions, means for deriving from said storage device a second control signal having variations determined by said signal storage pattern during the scanning thereof by the said beam of the said storage device, and means responsive to said second control signal to vary the relative time phase position between the said wave and the position of the first mentioned beam on the said beam intercepting member.

20. A cathode-ray tube system as claimed in claim 19 wherein said means to apply said wave to said control means comprises means for energizing said control means during a given time interval, and wherein said means for applying said control signal to said storage device comprises means for energizing said storage device during a time interval different from said given time interval.

21. A cathode-ray tube system as claimed in claim 19 wherein said target system comprises means to store said first control signal in the form of an electrical charge pattern and wherein said storage device further comprises an auxiliary source adapted to impinge electrons onto said target system thereby to retain the said charge pattern during the scanning of said target by the beam of said storage device.

22. A cathode-ray tube system for producing a color television image, comprising a cathode-ray image producing tube having an electron beam intercepting member comprising consecutively arranged groups of phosphor stripes, the stripes of each of said groups being adapted to produce light of different colors in response to electron impingement, said intercepting member further comprising second portions having a geometric configuration indicative of the geometric configuration of said phosphor stripes, said cathode ray tube further comprising a source of an electron beam and means for varying the intensity of said beam, a first transmission path adapted to apply to said intensity varying means a wave having variations indicative of desired variations of the response of said phosphor stripes, means for scanning said beam across said beam intercepting structure thereby to energize said phosphor stripes and said second portions and to produce a first control signal as determined by the response of said second portions, an electrical charge storage device comprising a charge storage target system and a source of an electron beam for energizing said target system, means for scanning said last mentioned beam across said target system in synchronism with the scanning of said first mentioned beam across said beam intercepting member, a second signal transmission path interconnecting said beam intercepting member and said storage device, a gating system arranged in said second path and normally attenuating signals supplied to said second path, means for producing a gating signal at a given time interval, means for applying said gating signal to said gating system to render said second transmission path conductive to apply said control signal to said target system during said time interval and to produce at said target system a charge pattern corresponding to the configuration of said second portions as determined by said control signal, means for deriving from said storage device during time intervals other than said given time interval a second control signal having variations determined by said charge pattern during the scanning thereof by the said beam of the said storage device, and means responsive to said second control signal for varying the time phase position of said wave applied to said first transmission path.

23. A cathode-ray tube system as claimed in claim 22 wherein said first transmission path comprises a gating system adapted to attenuate signals applied to said first path, and further comprising means to apply to said gating system a gating signal for attenuating said wave during said given time interval.

24. A cathode-ray tube system as claimed in claim 22 wherein said means for producing a gating signal comprises a timer system, and said given time interval is a time interval substantially at the start of the period of operation of the cathode-ray tube system.

25. A cathode-ray tube system as claimed in claim 22 wherein said means for producing a gating signal comprises a timer system adapted to produce a gating signal in the form of pulses recurring periodically during the operation of said cathode-ray tube system.

26. A cathode-ray tube system as claimed in claim 22 wherein said storage device further comprises an auxiliary source adapted to impinge electrons onto said target system, and further comprising means responsive to said gating signal for de-energizing said auxiliary source in synchronism with the actuation of said gating system to render said second transmission path conductive.

27. A cathode-ray tube system as claimed in claim 22 further comprising means coupled to said scanning means for producing a second gating signal during flyback intervals of the scanning of said beam intercepting member, and means for applying said second gating signal to said gating means to attenuate signals in said second transmission path during said flyback intervals.

28. A cathode-ray tube system comprising: a cathode-ray tube having a member adapted to intercept charged particles comprising a plurality of first portions arranged in a given geometric configuration and adapted to produce a first given response upon impingement by said particles, said member further comprising a plurality of second portions arranged in a second given configuration indicative of said first configuration and adapted to produce a second given response different from said first given response upon impingement by said particles; said cathode-ray tube further comprising means for generating charged particles and for directing the same in beam formation toward said intercepting member and control means for varying the flow of said particles from said generating means; means for applying to said control means a wave having variations indicative of desired variations of said first portions and a frequency spectrum extending to a given maximum frequency value; means for cyclically interrupting said wave at a rate substantially greater than said maximum frequency value; means for scanning said charged particles in beam formation across said intercepting member thereby to energize said first and second portions and produce a first control signal determined by the response to said charged particles; and means for cyclically interrupting said control signal in synchronism with the interruption of said wave thereby to produce a second control signal determined by the response of said second portions and by the intensity of said wave during said interruptions of said wave.

References Cited in the file of this patent

UNITED STATES PATENTS

| | | |
|---|---|---|
| 2,492,926 | Valensi | Dec. 27, 1949 |
| 2,634,325 | Bond | Apr. 7, 1953 |
| 2,657,257 | Lesti | Oct. 27, 1953 |